United States Patent

Tanaka et al.

Patent Number: 6,115,430
Date of Patent: Sep. 5, 2000

[54] DIFFERENTIATING CIRCUIT AND CLOCK GENERATOR CIRCUIT USING THE DIFFERENTIATING CIRCUIT

[75] Inventors: Kazuo Tanaka; Hideaki Satoh, both of Tokyo, Japan

[73] Assignee: Oki Electric Industry Co., Ltd., Tokyo, Japan

[21] Appl. No.: 09/026,159

[22] Filed: Feb. 19, 1998

[30] Foreign Application Priority Data

Feb. 21, 1997 [JP] Japan .................................. 9-036820

[51] Int. Cl.$^7$ ............................................... H04L 25/06
[52] U.S. Cl. .......................................... 375/318; 327/359
[58] Field of Search .................................... 375/271, 286, 375/376, 373, 364, 355, 354, 342, 340, 236, 330, 333, 361, 371, 318, 297, 326, 359; 331/1 A; 360/46, 48; 341/68–71; 327/355, 259

[56] References Cited

U.S. PATENT DOCUMENTS

| | | | |
|---|---|---|---|
| 3,747,067 | 7/1973 | Fox et al. | 340/825.21 |
| 5,399,995 | 3/1995 | Kardontchik et al. | 331/17 |
| 5,559,777 | 9/1996 | Maeda et al. | 369/50 |
| 5,896,417 | 4/1999 | Lau | 375/258 |

OTHER PUBLICATIONS

"10 Gb/s GaAs MESET Timing Recovery Circuit IC's", 1991 Electronic Information Communication Society Autumn Convention; H. Kituchi; NTT Electronics Technology Corp.; pp. 5–132; and English–language Translation (2pgs.).

"Clock Extraction GaAs MSFET IC for 10Gb/s Optical Receiver", 1995 Electronic Information Communication Society Autumn Convention; K. Tanaka et al.; OKI Electronic Industry Co., Ltd.; p. 445; and English–language Translation (2pgs.).

*Primary Examiner*—Stephen Chin
*Assistant Examiner*—Lenny Jiang
*Attorney, Agent, or Firm*—Rabin & Champagne, P.C.

[57] ABSTRACT

A differentiating circuit and a clock generating circuit that do not include unwanted frequency components in a differentiated signal. An inverted signal of an NRZ (Non Return Zero) data signal is delayed by a fixed time in a delay circuit and added to a non inverted signal to generate a differentiated signal. A clock signal is generated by driving a resonator using a rectified signal produced by full wave rectifying the differentiated signal. At this time, resonant components arising due to impedance mismatching are removed by providing a LPF.

6 Claims, 9 Drawing Sheets

DIFFERENTIATING CIRCUIT AND CLOCK GENERATOR CIRCUIT USING THE DIFFERENTIATING CIRCUIT

CROSS REFERENCE TO RELATED APPLICATION

This application claims the priority of Japanese application serial No. 36820/1997, filed Feb. 21, 1997, the subject matter of which is incorporated herein by reference.

BACKGROUND OF THE INVENTION

1. Field of the Invention

The present invention relates to a differentiating circuit for generating differential signals for an NRZ (Non Return to Zero) data signal, and to a clock generating circuit for generating a clock signal from the differential signal. This differentiating circuit can be used, for example, in a doubler for doubling a reference clock signal or a timing recovery circuit for recovering a clock component from input data, for optical transmitters or optical receivers of optical communication systems.

2. Description of the Related Art

Generally, in optical communication systems, an optical transmission terminal is provided at one end of an optical transmission path, a plurality of low transmission rate circuits are time division multiplexed, and an optical signal having a higher transmission rate is transmitted to the transmission path. This time division multiplexing is usually carried out with a reference clock signal supplied to an optical transmitter, based on a clock signal that has been multiplied in accordance with a clock signal having a transmission rate of an optical signal sent to the optical transmission path. In order to multiply the clock signal, a differential waveform of the reference clock signal is generated and this differential waveform must be rectified.

Also, in an optical receiver, when logic levels and jitter of an input digital signal are identified and reproduced, this is usually carried out by latching an equalized clock signal using a specified clock signal. If the input data signal is a signal containing a clock component such as RZ (return to zero) code, a clock component can be easily extracted by passing the signal through a filter.

However, recent coding structures for the input data signal have been standardized towards NRZ (Non Return to Zero) code, and a circuit for differentiating this input data signal has become necessary in order to recover a clock component.

FIG. 1 is one example of a clock generating circuit of the related art. FIG. 2 is a signal waveform drawing for all parts of the clock generating circuit of FIG. 1. The clock generating circuit shown in FIG. 1 has a conventional differentiating circuit 10, a rectifying circuit 2, and a resonance circuit 3. The differentiating circuit 10 comprises a differential input buffer 11 to which the NRZ data signal S1 is differentially input, a delay circuit 12 in which the designed delay time is ½ of the length of a data hold period of the NRZ data signal, and a buffer 13. The rectifying circuit 2 comprises a non-linear circuit 21 for carrying out full-wave rectification of a differentiation signal generated in the differentiation circuit 10, and a buffer 22. Finally, the resonance circuit 3 comprises a resonator 31 resonating at a frequency having a period of the data hold period length of the NRZ data signal and an output buffer 32.

The differentiating circuit 10 has all components except the delay circuit 12 arranged on a single semiconductor substrate (not shown), and only the delay circuit 12 is attached externally. The delay circuit 12 is formed using a strip line. Further, a non-inverted NRZ data signal S2a and an inverted NRZ data signal S2b that have been generated in the buffer 11 are respectively delayed by the delay circuit 12, these delayed signals are respectively added to signals of the other side, and the resonator 31 generates the differential signal from the resultant signals.

Specifically, the signal S2ab which is the inverted NRZ signal S2b delayed is added to the non-inverted NRZ data signal S2a, and a differential signal S3a is generated. (The inverted differential signal S3b is obtained in a similar manner.) This differential signal S3a is full wave rectified by the non-linear circuit 21 and in this way a rectified signal S7a including a clock frequency component is generated. A clock signal S9a is generated by driving the resonance circuit 31 using this rectfied signal S7a. However, in the above described differentiation circuit of the related art, it is extremely difficult to manufacture so that the characteristic impedance of the delay circuit 12 and the output impedance of the differential input buffer 11 are matched.

It is also extremely difficult to manufacture the delay circuit 12 so that the delay time the has the designed value (specifically, a design value of half the period length of the NRZ signal data T0 equivalent to the period of a clock signal to be generated). This means that because of the above-mentioned lack of impedance matching, reflections occur at boundaries between the two components, and with respect to the delay circuit 12, reflections are repeated and resonance occurs at a specified frequency. The base resonant frequency f1[0] of this resonance is different from the clock frequency of the clock signals S9a, S9b, namely it is different from the resonant frequency f CLK of the resonator 31 and approaches fCLK because of manufacturing errors in the above mentioned delay time t1.

A resonant component of the above-mentioned delay circuit 12 is mixed with the differential signal, and part of the signal passes through the non-linear circuit 21 and is input to the resonator 31. Since the frequency f1[0] of the resonant component of the delay line becomes dose to the resonant frequency fCLK of the resonator 31, the resonant component is not removed, even in a resonator 31 with a high Q factor, and is mixed with the clock signal, and there is a problem that the integrity of the clock is lowered.

SUMMARY OF THE INVENTION

It is a primary object of this invention to provide a differentiating circuit that does not cause internally generated unnecessary frequency components (resonance components of a delay circuit) to be mixed with a differentiation signal, and a clock generating circuit that can generate a clock signal of high integrity.

A further object of this invention is to provide a clock generating circuit for generating a clock with little clock waveform distortion.

Still another object of this invention is to provide a differentiating circuit in which the parts of a circuit from a differential type input buffer to a rectifying circuit can be easily integrated onto a single IC.

These and other objects are achieved by a differentiating circuit provided with: a lowpass filter for removing unwanted resonance frequencies at the output side of a differential type output buffer, with the path length of delay lines in a delay circuit being set so that unwanted resonance frequencies occurring as a result of mismatching of the impedance of a differential input buffer and the impedance of a delay circuit are not close with respect to the input signal frequency; a rectifying circuit for generating a rectified signal of a clock component by rectifying a lowpass filter output signal at the output side of the lowpass filter; and a differential adjustment buffer for preventing reflections between the output side of the lowpass filter and the rectifying circuit.

A differentiating circuit of this invention comprising input means for generating a non-inverted NRZ data signal and an inverted NRZ data signal from an externally input NRZ data signal, and differential signal generating means for generating a differential signal by delaying the inverted NRZ data signal and adding this delayed signal to the non inverted NRZ data signal is provided with lowpass filter means for removing frequency components that are higher that frequencies with a period of double the data hold period of the NRZ data from the differential signal.

Further, the clock generating circuit of this invention has the above-described differentiating circuit, a rectifying circuit for generating a rectified signal by full wave rectfying the differential signal that has been generated by the differentiating circuit, and a resorator circuit, having a resonator for making frequencies of a period of the length of the data hold time of the NRZ data into resonant frequencies, for generating a clock signal by driving this resonator with the rectified signal.

BRIEF DESCRIPTION OF THE DRAWINGS

The objects and features of this invention may be more clearly understood with reference to the following detailed description of an illustrative embodiment of the invention, taken together with the accompanying drawings, in which.

DETAILED DESCRIPTION OF THE PREFERRED EMBODIMENT

First Embodiment of a Differentiating Circuit.

Figure 1:
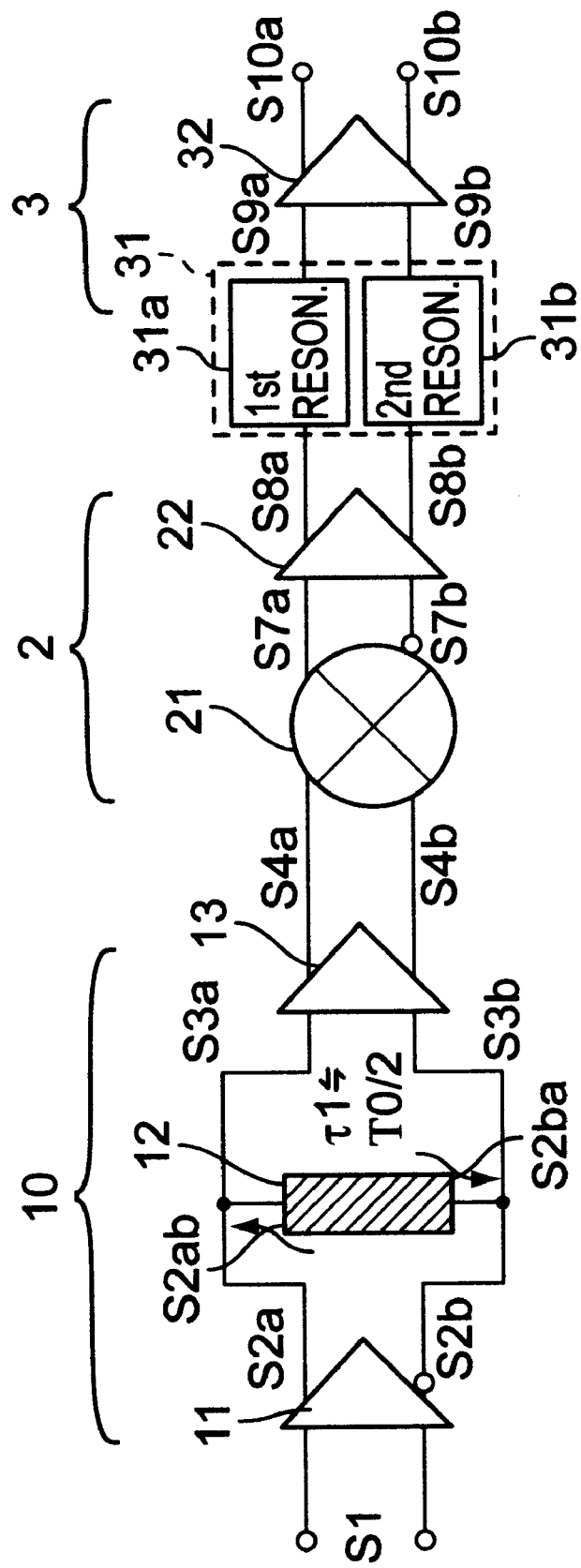
FIG. 1 is a block diagram of a clock generating circuit for describing the technique of the related art.
Figure 2:
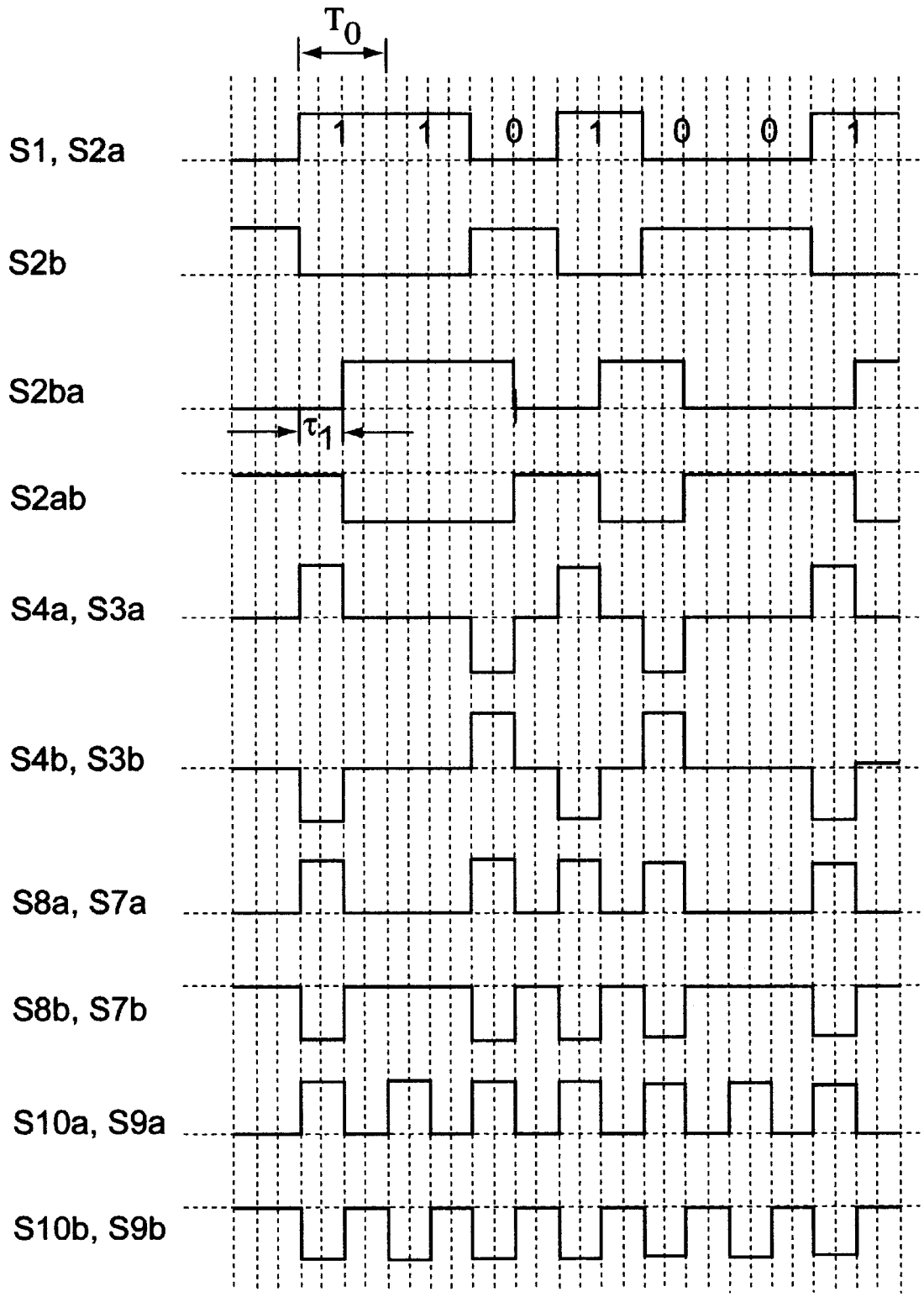
FIG. 2 is a timing diagram of each section of the clock generating circuit of the related art shown in FIG. 1.
Figure 3:
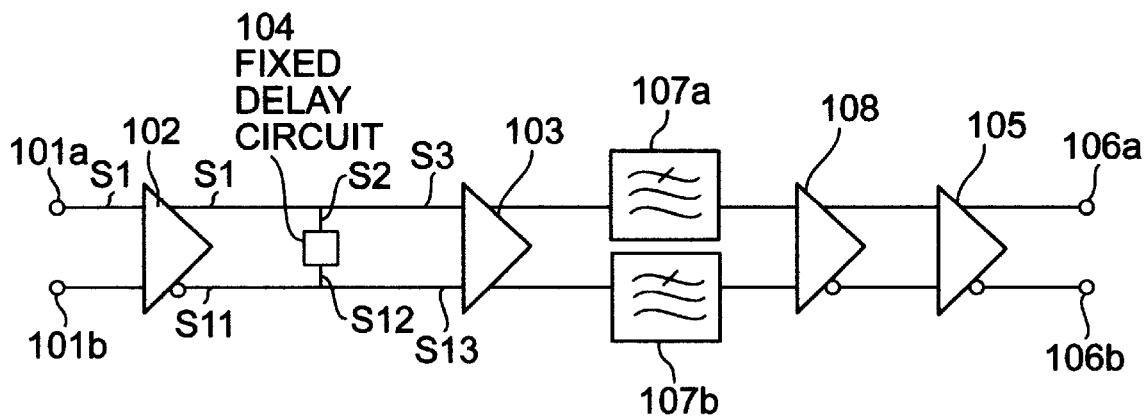
FIG. 3 is a block diagram showing a differentiating circuit of a first embodiment of this invention.

FIG. 3 is a block diagram showing the structure of a differentiating circuit of a first embodiment of this invention. The embodiment will be described below using FIG. 3.

As shown in FIG. 3, in this differentiating circuit, an input terminal 101$a$ is connected to a non-inverting input terminal of a differential input buffer 102. The input terminal 101$b$ is connected to the inverting input terminal of the differential input buffer 102. This differential input buffer has the function of generating a non-inverted signal S1 and an inverted signal S11 of an input signal S1.

The non-inverting output terminal of the differential output buffer 102 is connected to the non-inverting input terminal of the differential output buffer 103, and also to the inverting input terminal of the differential input output 103 through the fixed delay circuit 104. Similarly, the inverting output terminal of the differential input buffer 102 is connected to the inverting input terminal of the differential input output 103 and also to the non-inverting input terminal of the differential output buffer 103 through the fixed delay circuit 104.

The differential output buffer 103 outputs differential signals respectively generated from the fixed delay circuit 104, to the respective lowpass filters 107$a$, 107$b$. The differential matching buffer 108 is connected at its input side to the output side of the lowpass filters 107$a$, 107$b$, and at the output side to the input side of the rectifying circuit 105. The output terminals of the rectifying circuit 105 are connected to respective output terminals 106$a$, 106$b$.

In this first embodiment, the delay line length of the fixed delay circuit 104 is set such that unwanted resonance frequencies f1, occurring as a result of mismatching between the impedance of the differential input buffer 102 and the impedance of the fixed delay circuit 104, do not approach the frequencies of the input signal f0.

By setting the delay line length in this way, the unwanted resonance frequencies f1 can be provided by the following equation.

$$f1 = C0/2l\sqrt{\epsilon r} \, (n=1,2,\ldots)$$

In the above equation, n is the resonance mode, C0 is the speed of light, l is the delay line length, and $\epsilon r$ is the dielectric constant of a base of the delay line.

Namely, the original frequency of the input signal is known, and if the unwanted resonance frequencies separated to the extent that they can be removed by the low pass filters 107$a$, 107$b$ are known, a delay line length of the fixed delay circuit 104 can be obtained by calculating the above equation.

By providing the lowpass filters 107$a$, 107$b$ for removing unwanted resonance frequencies between the differential output buffer 103 and the rectifying circuit 105, it becomes possible to remove unwanted resonance frequencies f1 occurring due to impedance mismatching, distortion no longer occurs in the clock waveform generated by the rectifying circuit 105, and deterioration in the receive characteristics of a transmission device is prevented.

The differential matching buffer 108 is necessary to remove signal reflections occurring between the low-pass filters 107$a$, 107$b$ and the rectifying circuit 105.

Second Embodiment of a Differentiating Circuit.

Figure 4:
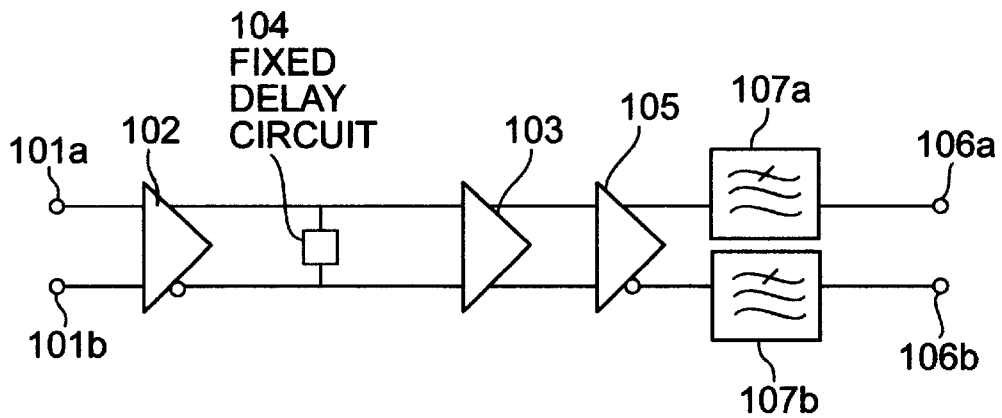
FIG. 4 is a block diagram showing a differentiating circuit of a second embodiment of this invention.

FIG. 4 is a block diagram showing the structure of a differentiating circuit of a second embodiment of this invention.

In FIG. 4, parts that are the same as those in the differentiating circuit shown in FIG. 3 have the same reference numerals attached thereto, and repeated description thereof will be omitted.

As shown in FIG. 4, this second embodiment is different from the first embodiment in that the lowpass filters 107a, 107b for removing unwanted resonance frequencies have been provided at the output side of the rectifying circuit 105. The setting of the delay line length of the fixed delay circuit 104 such that unwanted resonance frequencies, occurring as a result of mismatching between the impedance of the differential input buffer 102 and the impedance of the fixed delay circuit 104. do not approach the frequencies of the input signal, is the same.

In this second embodiment, the delay line length of the fixed delay circuit 104 is set such that the unwanted resonance frequencies and frequencies that are double the frequencies constituting the closest clock to the unwanted resonance frequencies do not approach each other, and the unwanted resonance frequencies are removed by the lowpass filters 107a, 107b that have been provided an the output side of the rectifying circuit 105.

By having such an arrangement, in the differential signal provided by inserting the fixed delay circuit 104 between the outputs of the differential input buffer 102, if frequency components based on the clock (frequencies F0) are made F1=F0/2, and unwanted resonance frequencies occurring because of impedance mismatch between the differential input buffer 102 and the fixed delay circuit 104 are made F2=F0+dF, then due to the non-linear characteristics of the rectifying circuit 105 frequency components that are F1 and F2, and respectively double, three times, etc., these frequencies are transmitted as they are, but among these, the size of higher order components that are at least double the frequency can be considered to be sufficiently small, and so can be disregarded. Accordingly, frequency components F1=F0/2, F2=F0+dF, F3=2×F1=F0 and F4=2×F2=2×F0+2×dF appear at the output of the rectifying circuit 105.

In an electrical circuit, generally speaking, leakage at the output side is small when the input frequency is low, and since the leakage from the output becomes larger as the input frequency increases, if the F1 component is made smaller, the F2=F0+dF, F3=2×F1 and F4=2×F2 components will become the principal components, but the frequency difference is made closest because of the unwanted resonance frequencies F2 and frequencies F3 that are double the frequency components based on the clock.

In this second embodiment, since the unwanted resonance frequencies occurring as a result of impedance mismatching are removed by the lowpass filters 107a, 107b after rectification by the rectifying circuit 105, distortion of the waveform of the clock generated by the rectifying circuit 105 no longer occurs, and deterioration in the receive characteristics of the transmission device is prevented.

Also, because the lowpass filters 107a, 107b for removing unwanted resonance frequencies are provided at the output side of the rectifying circuit 105 in this second embodiment, the problem of reflected signals is removed, and there is no need for the differential matching buffer 108 that was provided in the first embodiment of this invention. In integrating the components from the differential input buffer 102 to the rectifying circuit 105 into a single IC, there are problems of restrictions in the values of inductors and capacitors in the lowpass filters 107a, 107b formed of an LC circuit, surface area problems, and problems of manufacturing precision (error) and yield, but by reducing the number of buffers by one these problems can be decreased, and it is comparatively easy to put the case of the first embodiment into an IC.

Third Embodiment of a Differentiating Circuit.

Figure 5:
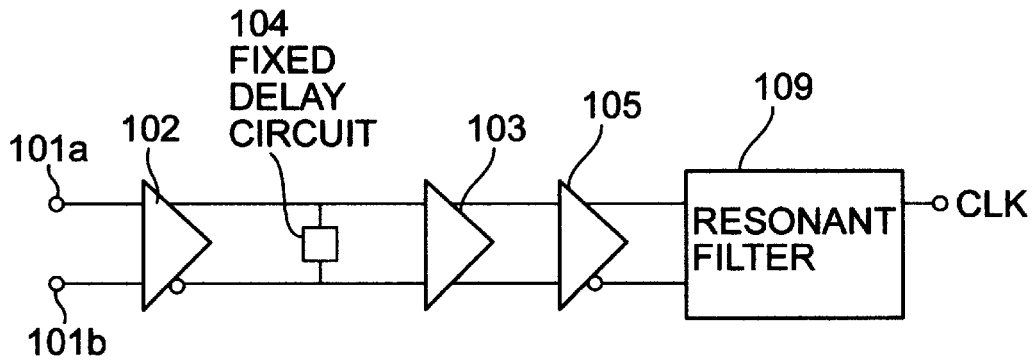
FIG. 5 is a block diagram showing a differentiating circuit of a third embodiment of this invention.

FIG. 5 is a block diagram showing the structure of a differentiating circuit of a second embodiment of this invention.

In FIG. 5, parts that are the same as those in the differentiating circuit shown in FIG. 4 have the same reference numerals attached thereto and repeated description thereof will be omitted.

As shown in FIG. 5, this third embodiment differs from the first embodiment in that a resonant filter 109 having a high Q value has been provided for extracting only clock components of a rectified signal, at the output side of the rectifying circuit 105. The output of this resonant filter 109 is recovered as a clock signal CLK. The setting of the delay line length of the fixed delay circuit 104 such that unwanted resonance frequencies, occurring as a result of mismatching between the impedance of the differential input buffer 102 and the impedance of the fixed delay circuit 104, do not approach the frequencies of the input signal, is the same as in the previously described embodiments.

In this third embodiment, only high pass components of the frequencies of the original signal are extracted by the resonant filter 109 that has been provided at the output side of the rectifying circuit 105, which means that it becomes possible to remove unwanted resonance frequencies occurring as a result of impedance mismatching, as well as to remove lowpass components outside the clock frequencies, distortion of the clock waveform generated by the rectifying circuit 105 is reduced even more, and deterioration in the receive characteristics of a transmission device is prevented more effectively.

First Embodiment of a Clock Generating Circuit.

Figure 6:
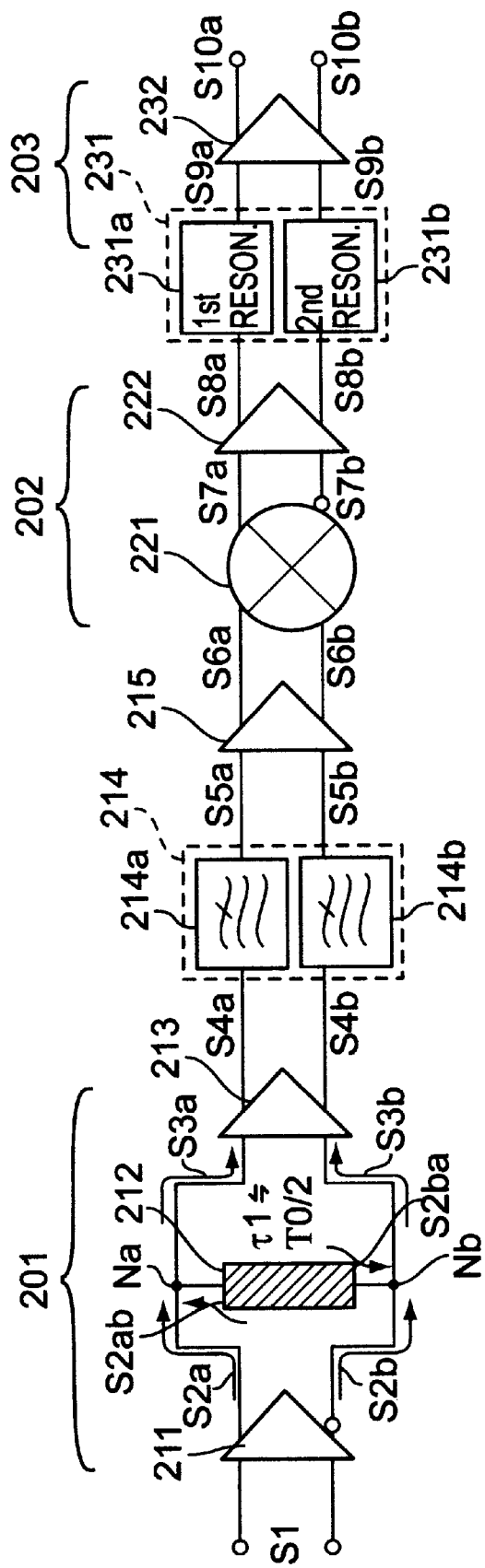
FIG. 6 is a block diagram showing a clock generating circuit of the first embodiment of this invention.
Figure 7:
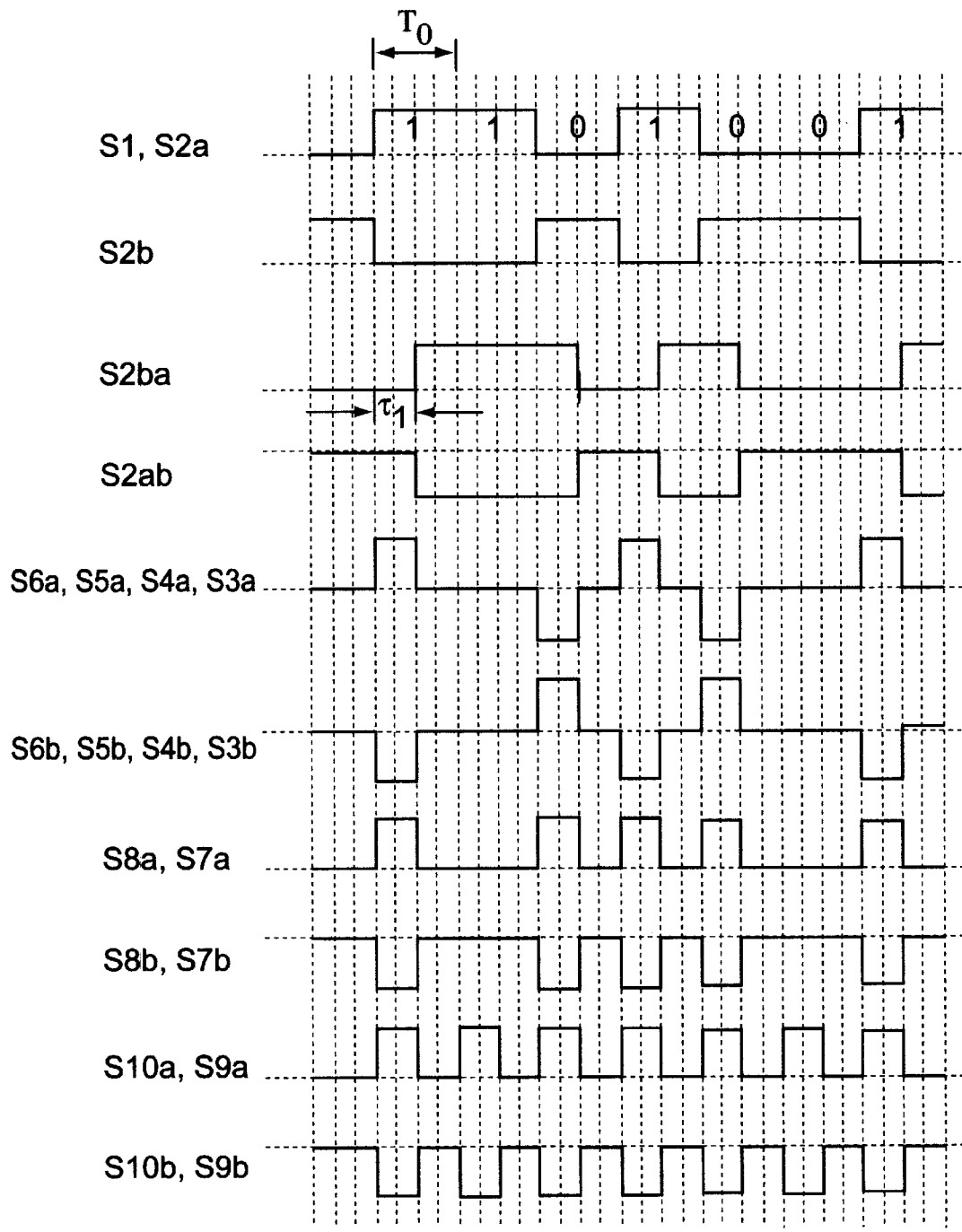
FIG. 7 is a timing diagram for all sections of the clock generating circuit of the first embodiment of this invention shown in FIG. 6.

FIG. 6 is a block diagram of a clock generating circuit of a first embodiment of this invention. FIG. 7 is a timing diagram for each section of the clock generating circuit shown in FIG. 6.

The clock generating circuit shown in FIG. 6 has a differentiating circuit 201, a rectifying circuit 202 and a resonant circuit 203, and generates a clock signal from an externally input NRZ (Non Return to Zero) data signal. The NRZ data signal is a signal that becomes an "L" level or an "H" level in every data period (a signal being "0" or "1"). If the length of the data hold period of the NRZ data signal is made T0, then clock generating circuit shown in FIG. 6 generates a clock signal having a frequency fCLK=1/T0. Components at a frequency f0=1/(2×T0) are also included in the NRZ data signal having a data hold period of T0. This f0 (=fCLK/2) will be referred to as the ½ clock frequency.

The differentiating circuit 201 is provided with a differential input buffer 211, a delay circuit 212, buffers 213 and 215, and a lowpass filter (LPF) 214, and generates a differential signal by differentiating an input NRZ data signal. The differential input buffer 211 and the buffers 213 and 215 are arranged on a single semiconductor substrate, not shown in FIG. 6 (this semiconductor substrate will be referred to simply as an IC hereafter), and the delay circuit 212 is attached outside the IC.

The differential input buffer 211 has two differential input terminals being input with an NRZ data signal S1 from outside, a non-inverting output terminal and an inverting output terminal. A non-inverted NRZ data signal S2a is output from the non-inverting output terminal, and an inverted NRZ data signal S2b is generated by inverting the NRZ data signal S1, and output from the inverting output terminal. This differential input buffer 211 is for achieving impedance matching with the delay circuit 212 (Actually, it is difficult to achieve complete impedance matching due to manufacturing errors of the delay circuit 212).

The delay circuit 212 is a bidirectional delay circuit having a first main terminal connected to the inverting output terminal of the differential input buffer 211, and a second main terminal connected to the non-inverting output terminal of the differential input buffer 211. The inverted NRZ data signal S2b input to the first main terminal is delayed only by time t1, and this delayed signal S2ab is output from the second main terminal, while the non-inverted NRZ data signal S2e input to the second main terminal is delayed by only time t1, and this delayed signal S2ba is output from the first main terminal (the point of connection to the non-inverting output terminal of the differential output buffer 211 will be made node Na; and the point of connection to the inverting output terminal of the differential input buffer 211 will be made node Nb). The delay time t1 is set to T0/2 (T0 is the data hold time of the NRZ data signal). In actual fact, it is difficult to set the delay time to exactly t1=T0/2, due to manufacturing errors of the delay circuit 212. This delay circuit 212 can be formed for example, by forming a strip line on a dielectric body, connecting one end of the strip line to the inverting output terminal of the differential input buffer 211 using a first bonding wire, connecting the other end of the strip line to the non-inverting output terminal of the differential input buffer 211 using a second bonding wire, and using the end of the first bonding wire at the IC side as the first main terminal, and the end of the second bonding wire at the IC side as the second main terminal.

An inverted differentiated signal S3b is generated at node Nb by adding together the differential signal S2b and the delayed signal S2ba, and a differentiated signal S3a is generated at node Na by adding together the differential signal SZa and the delayed signal S2ab. The differentiated signal S3a and the inverted differentiated signal S3b are three value signals having one of "H", "M" or "L" levels.

Resonance occurring in the delay circuit 212 will now be described. There are manufacturing errors in the output impedance of the inverting output terminal and non-inverting output terminals of the differential input buffer 211, and in the characteristic impedance of the delay circuit 212, which means that exact impedance matching is not achieved between the non-inverting output terminal and the delay circuit 212, or the inverting output terminal and the delay circuit 212. This means that a boundary A for Node Na and a boundary B for node Nb both constitute mismatched points, and signal reflections occur at these boundaries. The characteristic impedance of the delay circuit 212 using a strip line is determined depending on such factors as the thickness of the dielectric body and the line width of the strip line, but these are also subject to manufacturing variations, and so the characteristic impedance value is wrong compared to a design value. Also, the output impedance of the differential input buffer 211 is determined depending on such factors as the resistance value of a load resistance, the drain conductance of an FET, the inductance of an inductor used for peaking, parasitic capacitance, etc., but these are all also subject to manufacturing variations. There are also factors that can not be estimated at the time of design, which means that the output impedance is wrong compared to the design value. Further, in the event that both boundaries (boundary A and boundary B) in the signal transmission path described above (the delay circuit 212) are mismatched points, reflections are repeated at both boundaries and resonance occurs at a specific frequency.

Further, the signal delay time t1 of the delay circuit 212 is determined depending on such factors as the line length of the strip line, the length of the bonding wires, the dielectric constant of the transmission path, etc., but these all have manufacturing variations (for example, it is extremely difficult to actually attach a fixed length wire) which means that the signal delay time t1 is wrong compared to a design value of T0/2 (T0 is the data hold time of the NRZ data signal).

Figure 8:
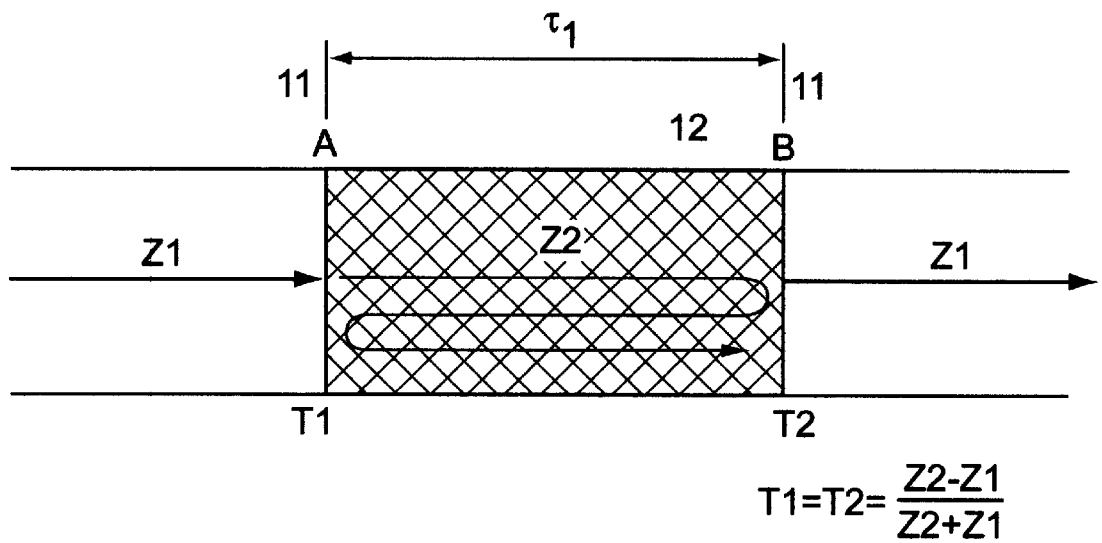
FIG. 8 is a drawing describing the general concept of reflections and resonance occurring in a delay circuit of the clock generating circuit of the first embodiment of this invention.

FIG. 8 is a drawing for describing the above mentioned reflections and resonance in the delay circuit 212. As shown in FIG. 8, signals reaching the boundaries A and B constituting mismatched points are partially reflected according to the reflection coefficient. Resonance occurs at a particular frequency in the delay circuit 212 because of returned signals that are reflected at the boundaries A and B. The above-described reflection coefficient becomes larger as the extent of impedance mismatching increases, and the strength of the reflected signal also becomes large compared to the transmitted signal. If the output impedance of the non-inverting output terminal and the inverting output terminal of the differential input buffer 211 are both Z1, and the characteristic impedance of the delay circuit 212 is Z2, then the reflection coefficient G1 of boundary A and the reflection coefficient G2 of boundary B is expressed as follows.

$$G1=G2=(Z2-Z1)/(Z2+Z1) \qquad (1)$$

Also, when the boundaries A and B are mismatched points, if the signal frequency at which resonance occurs in the delay circuit 212 (resonant frequency) is f1 [N] (N=0,1,2 . . . ), then f1 [N] can be represented by an equation using the signal delay time t0 of the delay circuit 212.

$$f1[N]=(1/(2\times t1))\times(1+N) \qquad (2)$$

Here, if t1 is equal to the design value T/2, a base resonant frequency f1[0] for N=0 becomes as shown in the following equation.

$$f1[0]=1/T0=fCLK \qquad (3)$$

That is, it becomes equal to the clock frequency fCLK. However, the delay time t1 is wrong compared to the design value, for the reasons mentioned above, and if the delay time t1 is expressed using a constant representing the error 1/k (when errors are 0, k will be 1), the data hold period of the NRZ data signal and the clock frequency fCLK, it becomes $$t1=(1/k)\times(T0/2) \qquad (4)$$
$$=(1/k)\times(1/(2\times fCLK)) \qquad (5)$$

At this time, the base resonant frequency f1[0] for N=0 becomes $$f1[0]=k\times fCLK \qquad (6)$$

When the error constant k is not 1 but a value approaching 1, the base resonant frequency f1[0] is different from the clock frequency fCLK but approaches fCLK. This resonant component is mixed with the differentiated signal S3a and the inverted differentiated signal S3b.

As shown in FIG. 6, a buffer 213 is inserted to achieve impedance matching with the LPF 214 at the subsequent stage, and has a first input terminal to which the differentiated signal S3a is input, a second input terminal to which the inverted differentiated signal S3b is input, a first output terminal, and an second output terminal. The first input terminal and the first output terminal, and the second input terminal and the second output terminal respectively constitute two sets of impedance changing buffers. The delay circuit 212 and the buffer 213 together constitute differentiated signal generating means, and by adding the delayed signal S2ab, delayed from the inverted NRZ data signal, to the non-inverted NRZ data signal S2a, a differentiated signal S3a of the NRZ data signal S1 is generated.

The LPF has a first LPF 214a and a second LPF 214b each respectively having a pass band up to ½ of the clock frequency f0. The LPF 214a outputs the differentiated signal S5a by removing the resonant components of the delay line 212 contained in the differentiated signal S4a from the buffer 213, while the LPF 214b outputs the inverted differentiated signal S5b by removing the resonant components of the delay line 212 contained in the differentiated signal S4b from the buffer 213. A LPF formed from resistors and capacitors, for example, can be used as the LPF 214a and the LPF 214b.

The buffer 215 has been inserted to achieve impedance matching to the rectifying circuit 202 at the subsequent stage, and has a first input terminal to which is input the differentiated signal S5a from the LPF 214a, a second input terminal to which is input the inverted differentiated signal S5b from the LPF 214b, a first output terminal and a second output terminal. The first input terminal and the first output terminal, and the second input terminal and the second output terminal, respectively constitute two sets of impedance changing buffers. The LPF 214a and the buffer 215 together constitute lowpass means, so that frequency components higher than ½ of the clock frequency fCLK, namely unwanted high frequency components included in the resonant component of the delay circuit 212, are removed from the differentiated signal S5a.

The rectifying circuit 202 has a non-linear circuit 221 and a buffer 222, and full wave rectifies the differentiated signal that has been generated by the differentiating circuit 201 to generate a rectified signal including components at the clock frequency fCLK. The non-linear circuit 221 has a first input terminal to which the differentiated signal S6a from the buffer 215 is input, a second input terminal to which the differentiated signal S6b from the buffer 215 is input, a non-inverting output terminal and an inverting output terminal. The differentiated signal S6b is full wave rectified by making "L" level portions "H" level to thus generate the rectified signal S7a which is then output from the non-inverting output terminal, and the differentiated signal S6a is full wave rectified by making "H" level portions "L" level to thus generate the inverted rectified signal S7b, being an inverted signal of the rectified signal S7a, which is then output from the inverting output terminal.

The buffer 222 is inserted to achieve impedance matching with the resonant circuit 203 at the subsequent stage, and has a first input terminal to which the rectified signal S7a is input, a second input terminal to which the inverted rectified signal S7b is input, a first output terminal and a second output terminal. The first input terminal and the first output terminal, and the second input terminal and the second output terminal, respectively form two sets of impedance changing buffer circuits.

The resonant circuit 203 is provided with a resonator 231 and an output buffer 232, and generates a clock signal by recovering clock frequency components from the rectified signals generated by the rectifying circuit 202. The resonator 231 has a first resonator 231a and a second resonator 231b for changing the respective clock frequencies fCLK to the resonant frequency. The resonator 231a is driven by the rectified signal S8a from the buffer 222 (resonated by the clock frequency fCLK components of the rectified signal S8a) to generate the clock signal S9a having the clock frequency fCLK. The resonator 231b is driven by the inverted rectified signal S8b from the buffer 222 (resonated by the clock frequency fCLK components of the inverted rectified signal S8b) to generate the clock signal S9a having the clock frequency fCLK, which is an inverted signal of the clock signal S9a. Resonators for providing a high integrity clock signal with reduced jitter, and having as high a Q value as possible, are used as the resonators 231a and 231b. For example, a dielectric filter having a Q value of about 1000 is used.

The output buffer 232 has a first input buffer to which the clock signal S9a is input, a second input terminal to which the inverted clock signal S9b is input, a first output terminal and a second output terminal. The first input terminal and the first output terminal, and the second input terminal and the second output terminal, respectively form two sets of impedance changing buffer circuits. A clock signal S10a is provided to an external circuit (not shown) from the first output terminal, and an inverted clock signal S10b is provided to an external circuit from the second output terminal.

Next, the operation of the clock generating circuit of FIG. 6 having the above-mentioned construction will be described. If an NRZ data signal S1 is input, a non-inverted NRZ data signal S2a and an inverted NRZ data signal 2b are produced at the differential output buffer 211. The inverted NRZ data signal S2b that has been input to the delay circuit 212 from node Nb is delayed by only time t1 (refer to equation (4), equation (5)). This delayed signal S2ab is propagated to the node Na side and added to the non-inverted NRZ data signal S2a, thus producing the differentiated signal S3a. Similarly, the non-inverted NRZ data signal S2a that has been input to the delay circuit 212 from node Na is relayed by only time t1. This delayed signal S2ba is propagated to the node Nb side and added to the inverted NRZ data signal S2b, thus producing the inverted differentiated signal S3b.

Here, the differentiated signal S3a and the differentiated signal S3b are three value signals having any one of "H", "M" or "L" levels. That is, if the NRZ data signal S1 changes from an "L" level to an "H" level, the differentiated signal S3a will become an "H" level signal in the period t1, while if the NRZ data signal changes from an "H" level to an "L" level the differentiated signal S3a will become an "L" level signal in the period t1, and will be an "M" level signal during periods outside t1. If the NRZ data signal S1 changes from an "L" level to an "H" level, the inverted differentiated signal S3b will become an "L" level signal in the period t1, if the NRZ data signal changes from an "H" level to an "L" level the inverted differentiated signal S3b will become an "H" level signal in the period t1, and will be an "M" level signal during periods outside t1. As will be understood from the timing diagram shown in FIG. 7, signal components of the differentiated signal S3a and the inverted differentiated signal S3b are components less than ½ of the clock frequency f0, but resonance occurs in the delay line 212 due to the effects of mismatching between the characteristic impedance of the delay circuit 212, the output impedance of the differential input buffer 211 and the input impedance of the buffer 213, and resonant components at the base resonant frequency f1[0] (=k×fCLK, refer to equation 6) are mixed in to the differentiated signal S3 and the inverted differentiated signal S3b.

Figure 9:
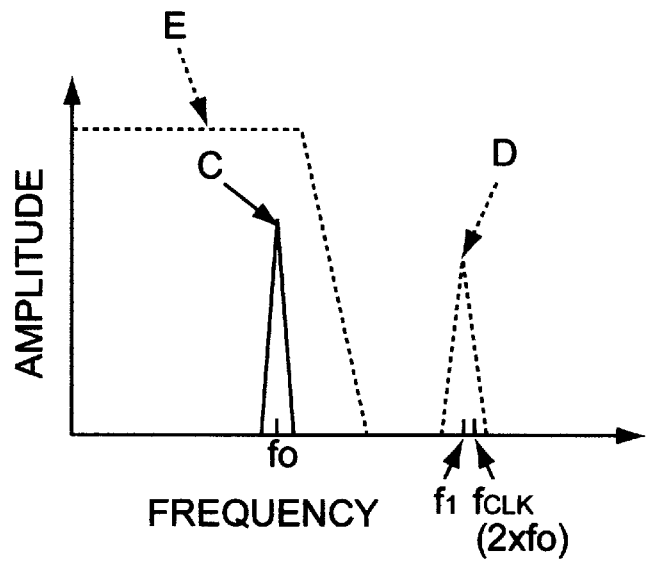
FIG. 9 is a drawing showing the relationship between the frequency spectrum of a differential circuit that has been generated in the clock generating circuit of this invention, and the filter characteristics of an LPF (lowpass filter) in the differentiating circuit of the first embodiment.

Next, the differentiated signal S3a and the inverted differentiated signal S3b are input as differentiated signal S4a and the inverted differentiated signal S4b to the LPF 214 via the buffer 214, and the LPF 213 removes resonant components of the delay line 212. FIG. 9 is a drawing showing the frequency spectrum of the differentiated signal S3a and the inverted differentiated signal S3b. and the filter characteristic of the LPF 214 in FIG. 9, C represents a main signal component of a differentiated signal, and D represents resonant components of the delay circuit 212 that are included in the differentiated signal. By setting the cut-off frequency of the filter characteristic between ½ of the clock frequency f0 and the clock frequency fCLK, resonant components of the delay circuit 212 can be easily removed from the differentiated signals.

Again, as shown in FIG. 6 and FIG. 7, the differentiated signal S5a and the inverted differentiated signal S5b that have had resonant components of the delay circuit 212 removed by the LPF 214 are input to the non-linear circuit 221 as differentiated signal S6a and the inverted differentiated signal S6b, via the buffer 215. The non-linear circuit 221 generates the rectified signal S7a by carrying out full wave rectification to make "L" level portions of the differentiated signal S6a "H" level. The non-linear circuit 221 also generates the rectified signal S7b by carrying out full wave rectification to make "H" level portions of the differentiated signal S6b "L" level Components at the clock frequency fCLK are included in the rectfied signal S7a and the rectified signal S7b, as will be understood from the waveforms shown in FIG. 7, and resonant components that had occurred in the delay circuit 212 have already been removed by the LPF 214 and so are not included in the rectified signals.

The rectified signal S7a and the rectified signal S7b are then input to the resonator 231 as rectified signal S8a and the rectified signal S8b, via the buffer 222. The rectified signal S8a and the rectified signal S8b respectively drive the resonator 231a and the resonator 231b, thus producing the clock signal S9a and the inverted clock signal S9b having the clock frequency fCLK. The clock signal S9a and the inverted clock signal S9b are externally output from the output buffer 232. The clock signal S9a and the inverted clock signal S9 are high integrity clock signals not containing resonant components occurring in the delay circuit 212.

As has been described, according to the first embodiment of the differentiating circuit 201 it is possible to generate a differentiated signal that does not include unwanted high frequency components that are close to the clock frequency, even if resonant components occurring in the delay circuit 212 are mixed in to the differentiated signals, because these components are removed by the LPF 214. Also, according to the clock generating circuit using the differentiating circuit 201, a high integrity clock that does not include unwanted high frequencies can be generated.

Second Embodiment of a Clock Generating Circuit.

Figure 10:
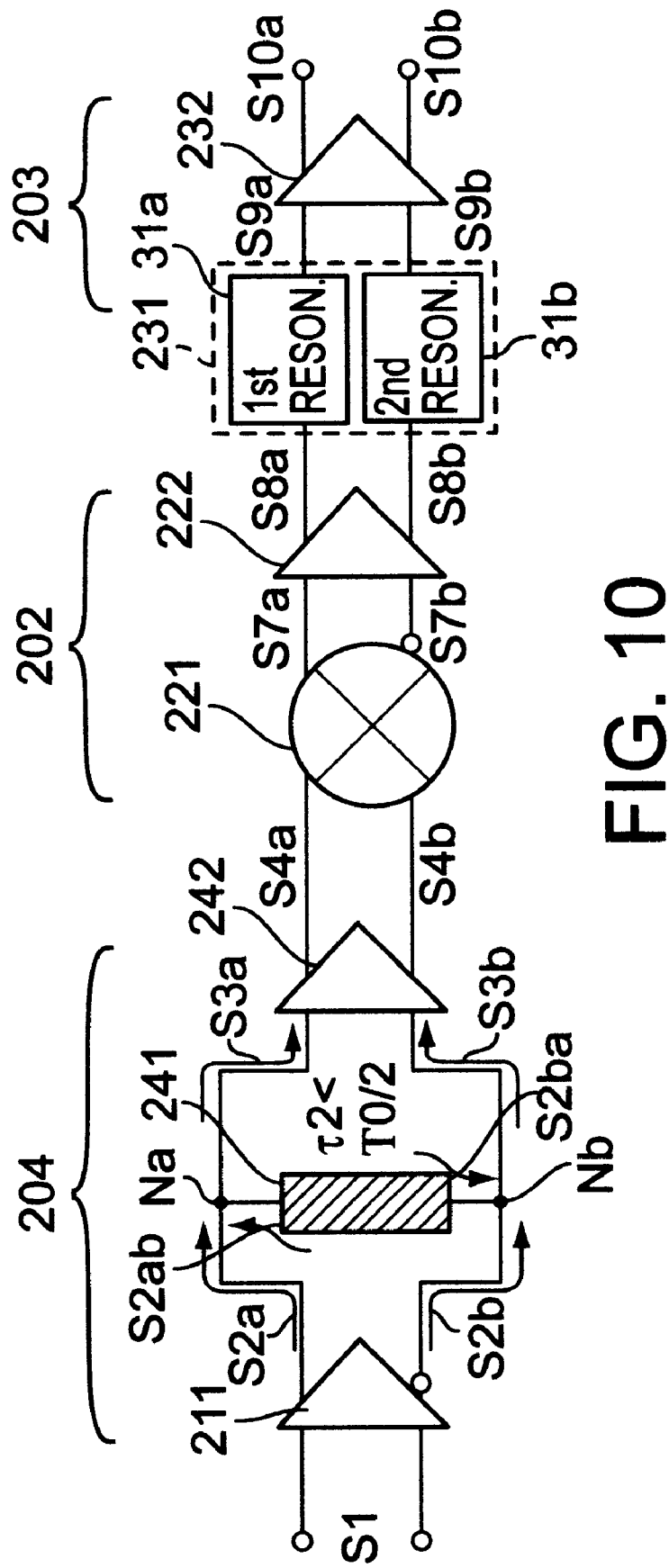
FIG. 10 is a block diagram showing a clock generating circuit of the second embodiment.
Figure 11:
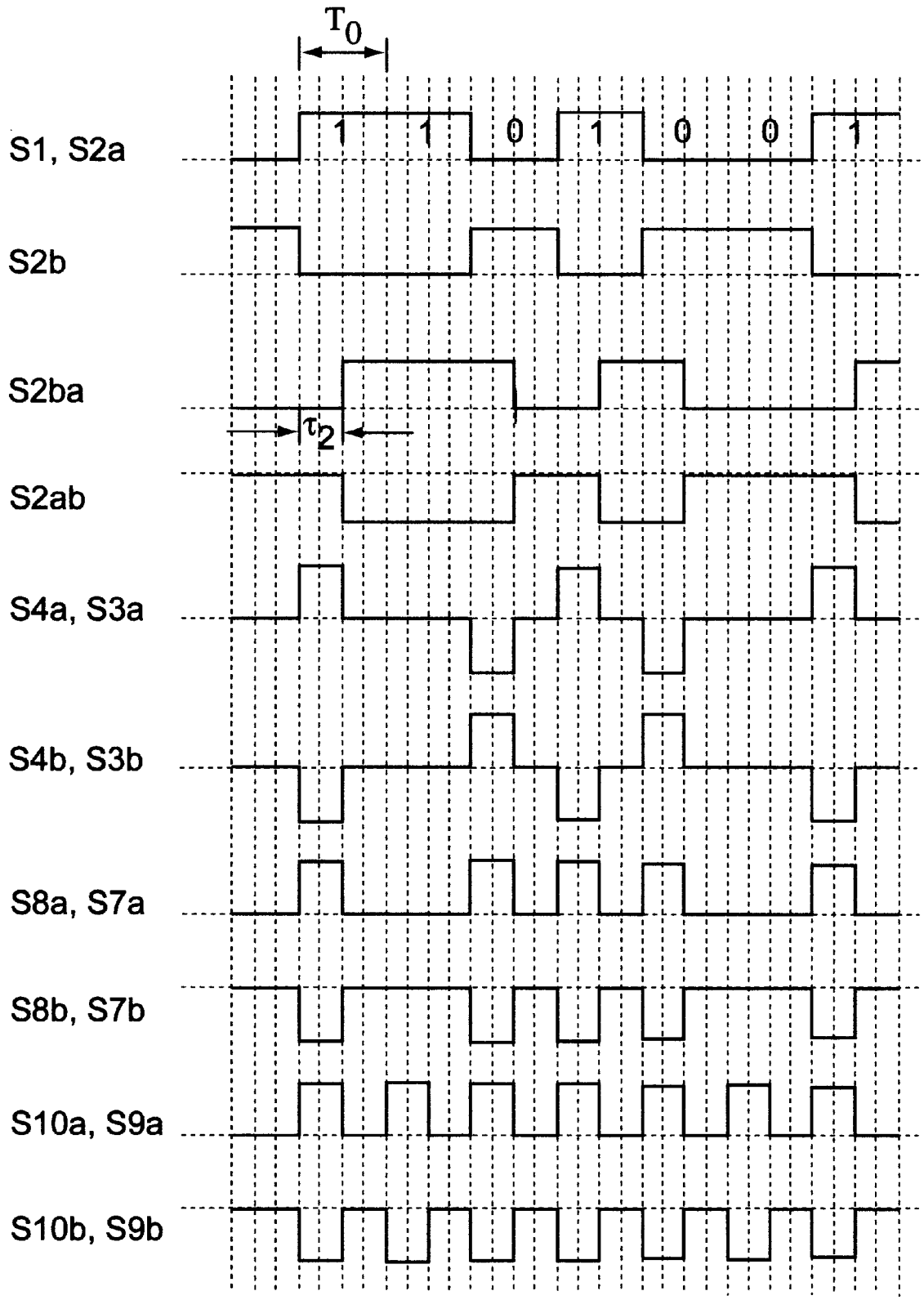
FIG. 11 is a timing diagram for all sections of the clock generating circuit used in the first embodiment of this invention shown in FIG. 10.

FIG. 10 is a clock generating circuit of a second embodiment of this invention. FIG. 11 is a timing diagram for each section of the clock generating circuit shown in FIG. 10. In FIG. 10, parts that are the same as those in the clock generating circuit shown in FIG. 6 have the same reference numerals attached thereto, and repeated description thereof will be omitted.

The clock generating circuit of FIG. 10 has a differentiating circuit 204, a rectifying circuit 202 and a resonant circuit 203. The rectifying circuit 202 and a resonant circuit 203 are the same as those shown in FIG. 6. The differentiating circuit 204 is provided with a differential output buffer 211, a delay circuit 241 and a buffer 242, and generates a differentiated signal by differentiating an NRZ data signal. The differential input buffer 211 and the delay circuit 241 are formed on a single IC (not shown), together with the rectifying circuit 202, and only the delay circuit 241 is attached outside the IC. The differential input buffer 211 is the same as that shown in FIG. 6.

The delay circuit 241 is a bidirectional delay circuit having a first main terminal connected to the inverting output terminal of the differential input buffer 211, and a second main terminal connected to the non-inverting output terminal of the differential input buffer 211. The differential signal S2a input to the first main terminal is delayed only by time t2, and this delayed signal S2ba is output from the second main terminal, while the non-inverted differential signal S2b input to the second main terminal is delayed by only time t2, and this delayed signal S2ab is output from the first main terminal.

The delay time t2 is a smaller value that T0/2 (@t1), for example as shown below.

$$t2=(1/k)\times(\text{⅜})\times T0 \tag{7}$$

$$=(1/k)\times(\text{⅜})\times fCLK \tag{8}$$

(k is an error constant). A delay circuit made using a strip line and bonding wires (the delay circuit used as the delay circuit 212 in FIG. 6) can be used as the delay circuit 241. At this time, the base resonant frequency f2[0] of resonance occurring in the delay circuit 241 becomes as shown in Equation (9).

$$f2[0]=k\times(\text{⅜})\times fCLK \tag{9}$$

If the delay time if the delay circuit is made smaller than T0/2 in this way, the base resonant frequency of the delay circuit will large. Accordingly, by setting the delay time t2 so that f2[0] is outside the resonant band of the resonator 231, resonant components of the delay circuit can be removed in the resonator 231.

The buffer 242 is inserted to perform impedance matching with the delay circuit 241 and with the rectifying circuit 202 (although in actual fact it is extremely difficult to achieve complete impedance matching), and has a first input terminal to which the differentiated signal S3a is input, a second input terminal to which the inverted differentiated signal S3b is input, a first output terminal and a second output terminal. The first input terminal and the first output terminal, and the second input terminal and the second output terminal respectively constitute two sets of impedance changing buffers.

The operation of the clock generating circuit having the construction of FIG. 10 will now be described. An inverted NRZ data signal S2b that has been input to the delay circuit 241 from node Nb is delayed by only time t2 (refer to equation (7) and equation (8)), is propagated to the node Na side as delayed signal S2ab and added to the non-inverted differentiated signal S2a, thus producing the differentiated signal S3a. Similarly, the non-inverted NRZ data signal S2a that has been input to the delay circuit 241 from node Na is delayed by only time t2, is propagated to the node Nb side as delayed signal S2ba and added to the inverted differentiated signal S2b, thus producing the inverted differentiated signal S3b.

At this time, as shown in FIG. 11, the duty cycle of the differentiated signal S3a and the inverted differentiated signal S3b becomes smaller compared to the differentiated signal S3a and the inverted differentiated signal S3b of FIG. 7. Also, resonant components at a frequency of the base resonant frequency f2[0] (=k×(⅜)×fCLK, refer to equation (9)) are mixed in to the signal components of the differentiated signal S3a and the inverted differentiated signal S3b.

Next, the above mentioned differentiated signal S3a and the inverted differentiated signal S3b are input via the buffer 242 to the non-linear circuit 21 as a differentiated signal S4a and inverted differentiated signal S4b, where they are subjected to full wave rectification to produce the rectified differentiated signal S7a and inverted rectified differentiated signal S7b. As can be understood from the waveforms of FIG. 11, components at the clock frequency fCLK are included in the rectified differentiated signal S7a and inverted rectified differentiated signal S7b. Also, compared to the rectified differentiated signal S7a and inverted rectified differentiated signal S7b shown in FIG. 7, the "H" level duty cycle of the rectified differentiated signal S7a shown in FIG. 11 and the "L" level duty cycle of the inverted rectified differentiated signal S7b shown in FIG. 11 are respectively smaller, and the resonant circuit 203 provides no obstacle to clock signal components.

The rectified differentiated signal S7a and inverted rectified differentiated signal S7b are then output to the resonator 231 as rectified differentiated signal S8a and inverted rectified differentiated signal S8, via the buffer 222. The rectified differentiated signal S7a and inverted rectified differentiated signal S7b respectively drive the first resonator 31a and the second resonator 31b, thus producing the clock signal S9a and the inverted clock signal S9b having the clock frequency fCLK.

At this time, resonant components included in the rectified differentiated signal S7a and inverted rectified differentiated signal S7b are outside the resonant band of the resonator 231, which means that they can not pass through the resonator 231 and are thus removed. Accordingly, the above-mentioned clock signal S9a and inverted clock signal S9b are high integrity clock signals not including resonant components that have been generated in the delay circuit 241. The clock signal S9a and the inverted clock signal S9b are externally output from the output buffer 233.

Figure 12:
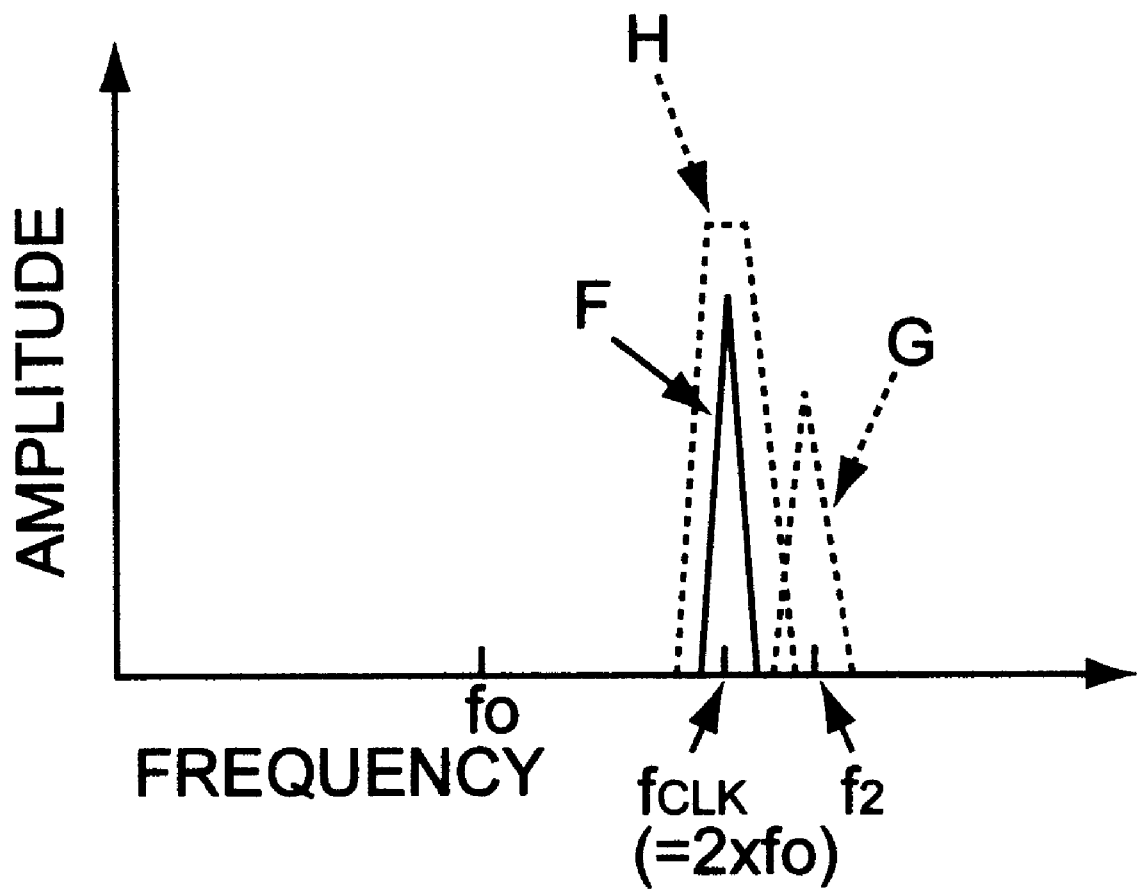
FIG. 12 is a drawing showing the relationship between the frequency spectrum of a rectified signal that has been generated in the clock generating circuit of the second embodiment of this invention, and the resonance characteristics of the resonator.

FIG. 12 is a drawing showing the frequency spectrum of the above-mentioned rectified differentiated signal S8a and inverted rectified differentiated signal S8b, and the resonant characteristics of the resonant circuit 231. In FIG. 12, F represents the main signal components of the rectified signal, and G represents the resonant components of the delay circuit 241 that are included in the rectified signal. H represents the resonant characteristic of the resonant circuit 231. If the delay time of the delay circuit is set so as to make the resonant components G outside of the resonant band H of the resonant circuit 231, the resonant components can removed in the resonant circuit 231.

In this way, according to this differentiating circuit 204, by setting the delay time of the delay circuit 241 smaller than ½ of the data hold time of the NRZ data signal and making the frequency of resonant components of the delay circuit 241 larger than the clock frequency fCLK, it is possible to generate a differentiated signal that does not include any unwanted high frequencies close to the clock frequency. Further, compared to the clock generating circuit of the first embodiment, the LPF can be obviated, which means that it is easy to realize as a high speed analog IC. According to the clock generating circuit using the differentiating circuit 204, the above mentioned resonant components are removed by the resonant circuit 231, and so it is possible to generate a high integrity clock signal that does not include any unwanted high frequency components.

It is possible to apply the differentiating circuit used in the above-mentioned first and second clock generating circuits not only to clock generating circuits, but also to frequency circuits etc.

As has been described above, according to the differentiating circuit of this invention, internally generated unwanted high frequency components can be removed by lowpass means, with the result that it is possible to generate a differentiated s signal that does not include any unwanted components close to a fixed frequency.

Also, by setting the delay time of a delay circuit of differentiated signal generating means smaller than ½ of the data hold time of an NRZ data signal and making the frequency of resonant components internally generated in the resonator larger than a fixed frequency, it is possible to generate a differentiated signal that does not include unwanted components close to the fixed frequency.

Further, according to the clock generating circuit of this invention, it is possible to generate a high integrity clock signal that does not include unwanted frequency components.

While particular embodiments of the present invention have been described and illustrated, it should be understood that the present invention is not limited thereto, and modifications may be made by a person skilled in the art. The present invention includes any and all such modifications as fall within the spirit and scope of the underlying invention described and claimed herein.

What is claimed is:

1. A differentiating circuit comprising:
   a differential input buffer for generating a non-inverted signal and an inverted signal from a Non Return to Zero (NRZ) code input signal, and respectively transmitting the non-inverted signal and the inverted signal;
   a delay circuit for generating a first differentiated waveform by combining said non-inverted signal output to one terminal and said inverted signal input to a remaining terminal and delayed, and generating a second differentiated waveform by combining said inverted signal input to said remaining terminal and said non-inverted signal input to said one terminal and delayed;
   a differential output buffer for transmitting said first and second differentiated waveforms generated by said delay circuit to output terminals;
   a lowpass filter for removing unwanted resonant frequency components at the output side of said differential output buffer;
   a rectifying circuit at the output side of said lowpass filter for rectifying an output signal from the lowpass filter, and generating a rectified signal having a clock component; and
   differential matching means for removing signal reflection between the output side of said lowpass filter and said rectifying circuit, wherein
      a delay line length of said delay circuit is set so that unwanted resonant frequency components generated due to impedance mismatching between the impedance of said differential input buffer and the impedance of said delay circuit are not close to the input signal frequency.

2. A differentiating circuit comprising:
   a differential input buffer for generating a non-inverted signal and an inverted signal from an NRZ code input signal which has a predetermined data hold period, and respective transmitting the non:inverted signal and the inverted signal;
   a delay circuit for generating a first differentiated waveform by combining said non-inverted signal input to one terminal and said inverted signal that has been input at another terminal and delayed, and generating a second differentiated waveform by combining said inverted signal input to said other terminal and said non-inverted signal that has been input to said one terminal and delayed;
   a differential output buffer for transmitting said first and second differentiated waveforms generated by said delay circuit to output terminals;

a rectifying circuit for rectifying an output signal from said differential output buffer, and generating a rectified signal having a clock component; and a lowpass filter for removing unwanted resonant frequency components from the output side of said rectifying circuit, wherein a delay time of said delay circuit is shorter than ½ the data hold period of said NRZ code input signal so that unwanted resonant frequency components generated due to impedance mismatching between the impedance of said differential input buffer and the impedance of said delay circuit are not close to frequencies double the input signal frequency.

3. A differentiating circuit comprising:

a differential input buffer for generating a non-inverted signal and an inverted signal from an NRZ code input signal which has a predetermined data hold period, and respectively transmitting the non-inverted signal and the inverted signal;

a delay circuit for generating a first differentiated waveform by combining said non-inverted signal input to one terminal and said inverted signal that has been input at another terminal and delayed, and generating a second differentiated waveform by combining said inverted signal input to said other terminal and said non-inverted signal that has been input to said one terminal and delayed;

a differential output buffer for transmitting said first and second differentiated waveforms generated by said delay circuit to output terminals;

a rectifying circuit for rectifying an output signal from said differential output buffer, and generating a rectified signal having a clock component; and a resonant filter having a high Q value, for extracting only clock components of the rectified signal at the output side of said rectifying circuit, wherein a delay time of said delay circuit is shorter than ½ the data hold period of said NRZ code input signal so that unwanted resonant frequency components generated due to impedance mismatching between the impedance of said differential input buffer and the impedance of said delay circuit are not close to the input signal frequency.

4. A differentiating circuit comprising:

input means for generating a non-inverted NRZ data signal and an inverted NRZ data signal from an externally input NRZ data signal, the data signal have a predetermined data hold period; and differentiated signal generating means for generating a differentiated signal by delaying said inverted NRZ data signal and adding the delayed inverted NRZ data signal to said non-inverted NRZ data signal; wherein said differentiating signal generating means delays said inverted NRZ data signal by a delay time that is shorter than ½ the data hold period of said NRZ data signal.

5. The differentiating circuit as disclosed in claim 4, wherein said output means has a non-inverting terminal for outputting a non-inverted NRZ data signal, and an inverting output terminal for outputting an inverted NRZ data signal, and said differentiated signal generating means has a delay circuit with a first main terminal connected to said inverted output terminal and a second main terminal connected to said non inverting output terminal, said delay circuit delaying a signal input from the first main terminal only by said delay time and outputting the delayed signal from the second main terminal.

6. The differentiating circuit as disclosed in claim 5, further comprising:

a rectifying circuit for generating a rectified signal by full wave rectifying said differentiated signal that has been generated by said differentiating circuit; and a resonator having as a resonant frequency a frequency having a period of the data hold time of said NRZ data signal, wherein a clock signal is generated by driving the resonator with said rectified signal.

* * * * *